US009632561B2

(12) United States Patent
Lindahl et al.

(10) Patent No.: US 9,632,561 B2
(45) Date of Patent: Apr. 25, 2017

(54) POWER-GATING MEDIA DECODERS TO REDUCE POWER CONSUMPTION

(75) Inventors: Aram Lindahl, Menlo Park, CA (US); Anthony J. Guetta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 11/770,446

(22) Filed: Jun. 28, 2007

(65) Prior Publication Data

US 2009/0003115 A1 Jan. 1, 2009

(51) Int. Cl.
*G06F 1/32* (2006.01)
(52) U.S. Cl.
CPC .......... *G06F 1/3275* (2013.01); *G06F 1/3225* (2013.01); *Y02B 60/1228* (2013.01)
(58) Field of Classification Search
CPC .............................. G06F 1/3234; G06F 1/3287
USPC .................................................. 713/320, 300
See application file for complete search history.

(56) References Cited

U.S. PATENT DOCUMENTS

| | | | | |
|---|---|---|---|---|
| 6,618,791 | B1 * | 9/2003 | Dodd et al. | 711/105 |
| 6,647,502 | B1 * | 11/2003 | Ohmori | 713/322 |
| 6,968,468 | B2 * | 11/2005 | Lam | 713/320 |
| 7,010,656 | B2 * | 3/2006 | Gupta | 711/165 |
| 7,183,825 | B2 * | 2/2007 | Padhye et al. | 327/202 |
| 7,437,502 | B1 * | 10/2008 | Coker | 711/112 |
| 7,584,312 | B2 * | 9/2009 | Kuroda et al. | 710/52 |
| 7,620,833 | B2 * | 11/2009 | Gan et al. | 713/324 |
| 2005/0165501 | A1 * | 7/2005 | Lian et al. | 700/94 |
| 2006/0120462 | A1 * | 6/2006 | Tsuboi | 375/240.25 |
| 2007/0133951 | A1 * | 6/2007 | Flecchia | 386/112 |

\* cited by examiner

*Primary Examiner* — Kim Huynh
*Assistant Examiner* — Eric Chang
(74) *Attorney, Agent, or Firm* — Blank Rome LLP (57) ABSTRACT

Embodiments of a system that reduces power consumption by power-gating media decoders are described. During operation of the system, a decoder circuit receives encoded audio data and outputs corresponding decoded audio data to a memory, which is electrically coupled to the decoder circuit. Moreover, control logic, which is electrically coupled to the memory and the decoder circuit, provides commands to the memory and the decoder circuit that selectively disable at least a portion of the memory based on an amount of decoded audio data in the memory.

15 Claims, 8 Drawing Sheets

FIG. 1

```
┌─────────────────────────────────────────────────────────────┐
│ RECEIVE INFORMATION FROM A MEMORY AND A DECODER CIRCUIT,    │
│ WHERE THE DECODER CIRCUIT IS CONFIGURED TO PROVIDE DECODED  │
│ AUDIO DATA TO THE MEMORY, AND WHERE THE INFORMATION         │
│ INDICATES AN AMOUNT OF DECODED AUDIO DATA IN THE MEMORY     │
│                            210                              │
└─────────────────────────────────────────────────────────────┘
                              │
                              ▼
┌─────────────────────────────────────────────────────────────┐
│ DETERMINE WHETHER TO SELECTIVELY DISABLE AT LEAST A PORTION │
│ OF THE MEMORY BASED ON THE AMOUNT OF DECODED AUDIO DATA IN  │
│                        THE MEMORY                           │
│                            212                              │
└─────────────────────────────────────────────────────────────┘
                              │
                              ▼
┌─────────────────────────────────────────────────────────────┐
│ PROVIDE COMMANDS TO THE MEMORY AND THE DECODER CIRCUIT THAT │
│ SELECTIVELY DISABLE AT LEAST THE PORTION OF THE MEMORY      │
│                            214                              │
└─────────────────────────────────────────────────────────────┘
```

FIG. 2A

```
                                                          ── 230
┌─────────────────────────────────────────────────────────────────┐
│  RECEIVE INFORMATION FROM A FIRST MEMORY AND A DECODER CIRCUIT, │
│ WHERE THE DECODER CIRCUIT IS CONFIGURED TO RECEIVE ENCODED AUDIO│
│ DATA FROM THE FIRST MEMORY, WHERE THE FIRST MEMORY IS CONFIGURED│
│   TO RECEIVE THE ENCODED AUDIO DATA FROM A SECOND MEMORY, AND   │
│    WHERE THE INFORMATION INDICATES AN AMOUNT OF ENCODED AUDIO   │
│                    DATA IN THE FIRST MEMORY                     │
│                               240                               │
└─────────────────────────────────────────────────────────────────┘
                                 │
                                 ▼
┌─────────────────────────────────────────────────────────────────┐
│  DETERMINE WHETHER TO SELECTIVELY DISABLE AT LEAST A PORTION OF │
│  THE SECOND MEMORY BASED ON THE AMOUNT OF ENCODED AUDIO DATA IN │
│    THE FIRST MEMORY, WHERE THE DECODER CIRCUIT IS CONFIGURED TO │
│  RECEIVE THE ENCODED AUDIO DATA FROM THE FIRST MEMORY EVEN WHEN │
│           THE PORTION OF THE SECOND MEMORY IS DISABLED          │
│                               242                               │
└─────────────────────────────────────────────────────────────────┘
                                 │
                                 ▼
┌─────────────────────────────────────────────────────────────────┐
│ PROVIDE COMMANDS TO THE SECOND MEMORY AND THE DECODER CIRCUIT   │
│    THAT SELECTIVELY DISABLE AT LEAST THE PORTION OF THE SECOND  │
│                              MEMORY                             │
│                               244                               │
└─────────────────────────────────────────────────────────────────┘
```

POWER-GATING MEDIA DECODERS TO REDUCE POWER CONSUMPTION

BACKGROUND

Field of the Invention

The present invention relates to techniques for managing power consumption. More specifically, the present invention relates to circuits and methods for selectively gating memory and media decoders.

Related Art

Advances in semiconductor process technology have made it possible for portable electronic devices, such as laptop computers and cellular telephones, to perform increasingly complicated functions. This has enabled such portable electronic devices to provide a wide variety of features and to support a large number of applications. However, the capabilities of energy-storage components in the portable electronic devices (such as batteries) have not increased at the same rate. Consequently, power consumption is becoming an increasingly significant constraint in the design of such portable electronic devices.

Many existing portable electronic devices address this problem by using power-management techniques. For example, circuits may be switched from an active mode of operation to a low-power or standby mode of operation when applications are not in use. Note that power is conserved in the standby mode of operation by turning off or disabling components and sub-circuits.

However, these existing power-management techniques are often implemented using a small number of inflexible rules. This is a problem because the power consumption of these portable electronic devices can vary dynamically based on user-defined conditions and interactions between applications executing on the portable electronic devices. Accommodating this time-varying power consumption is often challenging for existing power-management techniques.

Hence what is needed is a method and an apparatus that facilitates managing power consumption without the above-described problems.

SUMMARY

Embodiments of a system that can conserve power associated with operating media playback hardware and/or executing playback applications (e.g., software) are described. In particular, during media playback in the system, encoded data stored in a memory or buffer is supplied to a decoder, and decoded data output from the decoder is stored in another memory or buffer until it is consumed (such as when it is output to a user). Control logic (and/or instructions) in the system may be used to selectively enable and/or disable a portion of either or both of the memories and/or the decoder in this pipeline based on the amount of data in either or both of the memories. For example, if there is more than a pre-determined amount of decoded data in the other memory (e.g., the decoded data exceeds a threshold), a portion of the other memory that is used during decoding of the encoded data may be disabled (such as by disconnecting a power signal and/or a clock signal to a portion of the memory). Moreover, the selective enabling and disabling may also be based on a variety of additional parameters associated with: either or both of the memories, the decoder, the media being decoded, the playback hardware, and/or the playback application.

One embodiment of the present invention provides the system that reduces power consumption by power-gating media decoders. During operation of the system, a decoder circuit receives encoded audio data and outputs corresponding decoded audio data to a memory, which is electrically coupled to the decoder circuit. Moreover, control logic, which is electrically coupled to the memory and the decoder circuit, provides commands to the memory and the decoder circuit that selectively disable at least a portion of the memory based on an amount of decoded audio data in the memory.

In some embodiments, the portion of the memory which is selectively disabled is used when the decoder circuit is decoding audio data.

In some embodiments, the commands selectively disable at least a portion of the decoder circuit based on an amount of decoded audio data in the memory. Moreover, in some embodiments the selective disabling is based on transient power consumption associated with disabling the portion of the memory.

In some embodiments, the control logic is configured to select a duty cycle and/or a period for the selective disabling.

In some embodiments, the commands include turning off a power-supply signal and/or a clock signal used by the portion of the memory.

In some embodiments, the control logic is configured to selectively disable the portion of the memory when the amount of decoded audio data exceeds a pre-determined value. Moreover, in some embodiments the control logic is configured to provide additional commands to the memory and the decoder circuit, which selectively enable the portion of the memory based on the amount of decoded audio data in the memory. For example, the control logic may selectively enable the portion of the memory when the amount of decoded audio data is less than another pre-determined value. Note that the pre-determined value for disabling may be different from the pre-determined value for enabling.

In some embodiments, the selective disabling is based on: an amount of audio data remaining to be decoded; a rate of decoding of the audio data; a mode of playing the decoded audio data; and/or an amount of memory allocated for the decoded audio data.

In some embodiments, the selective disabling is aborted if the mode of playing the decoded audio data is changed and/or if a new mode of playing increases consumption of the decoded audio data in the memory.

In some embodiments, the selective disabling is aborted if the amount of memory allocated for the decoded audio data is changed.

In some embodiments, the decoded audio data is associated with a file, and the selective disabling is aborted if an end of the file is detected.

In some embodiments, the selective disabling is aborted based on a state of the decoder circuit.

Another embodiment provides an integrated circuit, which may be included in the system. During operation of this integrated circuit, an input interface receives information from the memory and the decoder circuit, where the information indicates the amount of decoded audio data in the memory. Next, a circuit, which is electrically coupled to the input interface, provides commands that selectively disable at least the portion of the memory based on the amount of decoded audio data. Then, an output interface, which is electrically coupled to the circuit, outputs the commands to the memory and the decoder circuit.

Another embodiment provides another integrated circuit, which may be included in the system. During operation of this integrated circuit, the input interface receives additional information from another memory and the decoder circuit. Note that the decoder circuit receives encoded audio data from the other memory, and the other memory receives the encoded audio data from an additional memory. Furthermore, the additional information indicates an amount of encoded audio data in the other memory. Next, the circuit provides additional commands that selectively disable at least a portion of the additional memory based on the amount of encoded audio data, where the decoder circuit is configured to receive the encoded audio data from the other memory even when the portion of the additional memory is disabled. Moreover, the output interface outputs the additional commands to the additional memory and the decoder circuit.

Another embodiment provides a method for conserving power, which may be performed by the system. During operation, the system receives information from the memory and the decoder circuit, where the decoder circuit is configured to provide decoded audio data to the memory and the information indicates the amount of decoded audio data in the memory. Next, the system determines whether to selectively disable at least the portion of the memory based on the amount of decoded audio data in the memory, and then provides commands to the memory and the decoder circuit that selectively disable the portion of the memory.

Another embodiment provides a computer system. This computer system may execute instructions corresponding to at least some of the above-described operations. Moreover, these instructions may include high-level code in a program module and/or low-level code that is executed by a processor in the computer system.

Another embodiment relates to a computer program product for use in conjunction with the system and/or computer system. This computer program product may include instructions corresponding to at least some of the above-described operations.

Another embodiment provides a portable device. This portable device may include one or more of the above-described integrated circuits and/or may execute instructions corresponding to at least some of the above-described operations. In some embodiments, the portable device includes a touch-sensitive display which is configured to determine movement of one or more points of contact by a user of the touch-sensitive display.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of hardware, software, and/or processes for using the hardware and/or software are described. Note that hardware may include a circuit, a device (such as a portable device), and/or a system (such as a computer system), and software may include a computer program product for use with the computer system. Moreover, in some embodiments the portable device and/or the system include one or more of the circuits (for example, in one or more integrated circuits).

These circuits, devices, systems, computer program products, and/or processes may be used to conserve power associated with media playback hardware and/or playback applications (e.g., software). In particular, during media playback encoded data stored in a memory or buffer is supplied to a decoder, and decoded data output from the decoder is stored in another memory or buffer until it is consumed (such as when it is output to a user). Control logic (and/or instructions) may be used to selectively enable and/or disable a portion of either or both of the memories and/or the decoder in this pipeline based on the amount of data in either or both of the memories. For example, if there is more than a pre-determined amount of decoded data in the other memory (e.g., the decoded data exceeds a threshold), a portion of the other memory that is used during decoding of the encoded data may be disabled (such as by disconnecting a power signal and/or a clock signal to a portion of the memory). Moreover, the selective enabling and disabling may also be based on a variety of additional parameters associated with: either or both of the memories, the decoder, the media being decoded, the playback hardware, and/or the playback application.

By determining when to selectively enable or disable one or more of these components (and, more generally, by transitioning one or more of these components between a sleep mode of operation and an active mode of operation), the control logic (and/or instructions) may be used to reduce power consumption in the device and/or system. In some embodiments, the control logic (and/or instructions) is used to adjust or optimize the power consumption associated with media playback during dynamic operation of the device and/or system.

These techniques may be used in a wide variety of devices and/or systems. For example, the device and/or the system may include: a personal computer, a laptop computer, a cellular telephone, a personal digital assistant, an MP3 player, a portable television, an iPod (a trademark of Apple, Inc.), an iPhone, and/or a device that plays back one or more types of media.

Circuits that conserve power in a device and/or a system in accordance with embodiments of the invention are now described. In the embodiments that follow, a technique is used to manage power consumption associated with decoding of audio data, such as audio files, in an audio decoder pipeline. However, in other embodiments the technique is applied to manage power consumption associated with decoding of other types of media (such as video) in another decoder pipeline and/or to manage power consumption associated with an arbitrary data pipeline. Note that the one or more circuits may be included on one or more integrated circuits, and that the one or more integrated circuits may be included in the device and/or the system.

Figure 1:
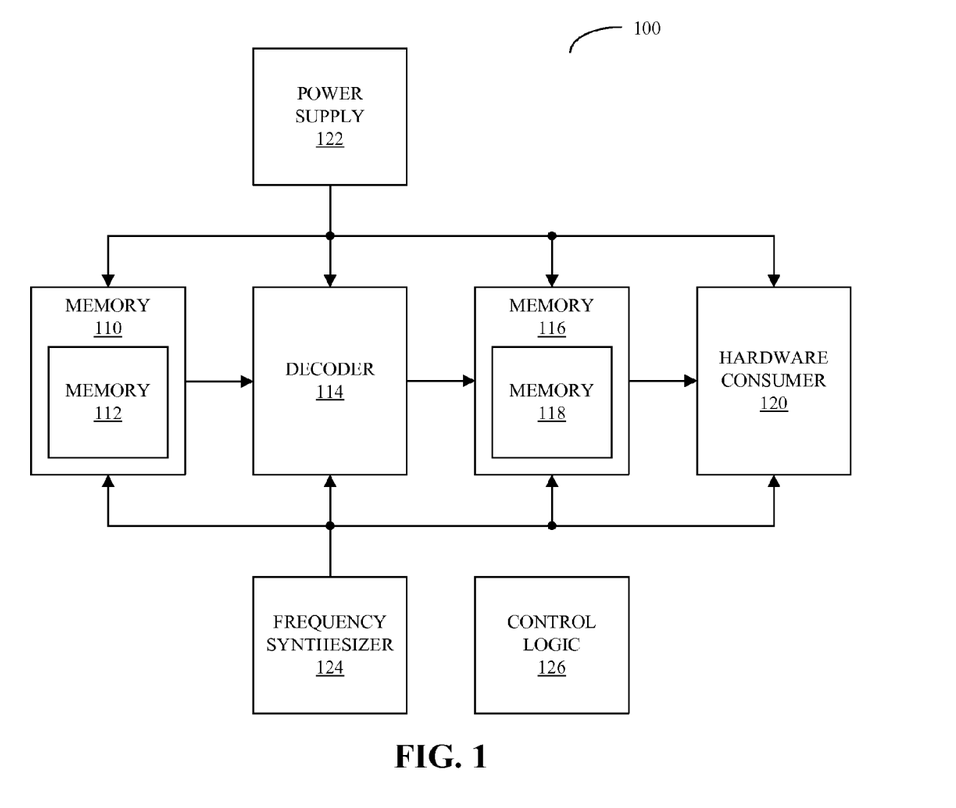
FIG. 1 is a block diagram illustrating a circuit in accordance with an embodiment of the present invention.

FIG. 1 presents a block diagram illustrating an embodiment of a circuit 100. Decoder 114 in this circuit may receive encoded data from memory 110 (such as a buffer) and may provide decoded data to memory 116. In an exemplary embodiment, the encoded data includes encoded audio data, which may be associated with a file (e.g., a song or an album). This audio data may be compatible with a variety of encoding or file formats, including: Advance Audio Coding (AAC), High Efficiency Advance Audio Coding (HE-AAC), an MPEG standard (such as MP3), Algebraic Code Excited Linear Prediction (ACELP), Apple Lossless Audio Codec (ALAC), Wave (WAV), Audio Interchange File Format (AIFF), Adaptive Multi-Rate (AMR), an Interactive Media Association (IMA) standard, and/or a QDesign Music Codec, as well as other encoding or file formats. However, note that the circuit 100 may be used to decode a variety of types of media, such as video and/or encrypted data.

Decoder 114 may use a portion of memory 110 (such as memory 112) during the receiving of the encoded data and/or a portion of memory 116 (such as memory 118) during the decoding of the encoded data. For example, memory 112 and/or memory 118 may be used as temporary memory during the decoding. In some embodiments, memory 112 includes a different type of memory than memory 110, and memory 118 includes a different type of memory than memory 116. For example, memory 112 and/or 118 may be SRAM and memory 110 and/or 116 may be DRAM. However, a wide variety of types of memory may be used for these components in the circuit 100, including: DRAM, SRAM, FLASH, solid-state memory, volatile memory, and/or non-volatile memory. Moreover, some or all of memory 110, 112, 116, and/or 118 may be separate components or integrated with one another into a single component.

Memory 116 may store the decoded data until it is consumed by hardware consumer 120 (such as one or more audio circuits and speakers) on behalf of a media playback application or software that executes in the device and/or the system which includes the circuit 100. When the decoded data is consumed (e.g., the decoded data is output to the hardware consumer 120), the consumed decoded data may be removed from the memory 116. Alternatively, consumed decoded data is no longer needed in the memory 116 and may be subsequently overwritten or erased.

In general, demand for decoded data may vary based on user commands and dynamic operation of the device and/or the system. During time intervals with low demand (relative to a rate at which the decoder 114 outputs decoded data), decoded data may accumulate in the memory 116. This time variation in the amount of data in the memory 116 provides an opportunity to reduce power consumption in the device and/or the system, which typically have limited power resources, such as battery life. In particular, control logic 126 may be used to selectively transition at least a portion of the memory 110 (such as the memory 112), at least a portion of the memory 116 (such as the memory 118), and/or at least a portion of the decoder 114 from an active mode of operation to a sleep mode of operation. For example, the control logic 126 may output commands that selectively disable or decouple power signals provided by power supply 122 and/or clock signals provided by frequency synthesizer 124 from the components that are being transitioned to the sleep mode of operation. Subsequently, the control logic 126 may output additional commands that selectively enable or couple the power signals and/or the clock signals to the components that are being transitioned to the active mode of operation.

In some embodiments, the selective transitioning to or from the sleep mode of operation is based on one or more parameters, including: the amount of encoded data to be decoded in at least the portion of the memory 110; the amount of decoded data in at least the portion of the memory 116; a rate at which data is decoded; a rate at which decoded data is consumed; a mode of playback; transient power consumption associated with the transition to the sleep mode of operation; transient power consumption associated with the transition from the sleep mode of operation; an amount of memory allocated to the decoding (such as the memory 118); and/or an amount of memory in the memory 116 allocated to storing decoded data. Consequently, control logic 126 may receive information from one or more components in the circuit 100, as well as from the media playback application, from which the control logic 126 determines whether or not to selectively transition to or from the sleep mode of operation.

As described below with reference to FIG. 3, note that in some embodiments the selective transitioning is gated by a state of the decoder 114. For example, commands to be output from the control logic 126 may be first approved by the decoder 114. This chained decision-making process may improve operation of the decoder 114.

Note that control logic 126 may transition back to the active mode of operation (i.e., may abort the sleep mode of operation) if changes occur in the device and/or system. In an exemplary embodiment, the control logic 126 selectively transitions to the active mode of operation if the mode of playing the decoded audio data is changed (such as during a seek operation) and if a new mode of playing increases a rate of consumption of the decoded audio data in the memory 116. Moreover, the sleep mode may be aborted if the amount of memory allocated for the decoded audio data is changed. For example, if the allocated memory is reduced to an amount that is less that a threshold associated with the decoded data (such that the threshold would never be reached), the sleep mode may be aborted. In some embodiments, the control logic 126 selectively transitions to the active mode of operation if an end of a file associated with the encoded data is detected.

In an exemplary embodiment, the decoder 114 builds up a large amount of decoded data in the memory 116 and, when the amount exceeds a threshold, the control logic 126 turns off one or more components in the circuit 100 (such as the memory 118 and/or at least a portion of the decoder 114) for a time interval. For example, the user may pause the playback application, which stops the hardware consumer 120. However, the decoding may continue until the memory 116 has sufficient decoded data (e.g., the amount of decoded data exceeds the threshold), and then the control logic 126 may turn off one or more components in the circuit 100. If the user subsequently starts the playback application and the amount drops below another threshold (which may be the same or different from the threshold), the one or more components may be turned back on for another time interval. In general, the control logic 126 may adjust both the period and the duty cycle associated with these intervals.

In another exemplary embodiment, the control logic 126 disables a portion of the memory 110 that provides encoded data to memory 112. After the portion of the memory 110 is disabled, the decoder 114 may continue to receive (at least for a period of time) encoded data from the memory 112.

In yet another exemplary embodiment, the encoded data includes audio data sampled at 44.1 kHz and 4 kB of decoded data corresponding to 23 ms of playback time. If the threshold in the memory 116 is at least 87 kB, memory 118 may be shut down for around 0.5 s. In other embodiments, one or more components in the circuit 100 are in the sleep mode for between 0.5-1 s.

By selectively transitioning one or more components in the circuit 100 to and from the sleep mode of operation, power consumption associated with the decoding pipeline illustrated in this circuit (and, more generally, with an arbitrary data pipeline) may be reduced, adjusted, and/or optimized.

Note that in some embodiments the circuit 100 includes fewer or additional components. Moreover, two or more components can be combined into a single component and/or a position of one or more components can be changed. In some embodiments, some or all of the functions illustrated in the circuit 100 are implemented in software.

Figure 2A:
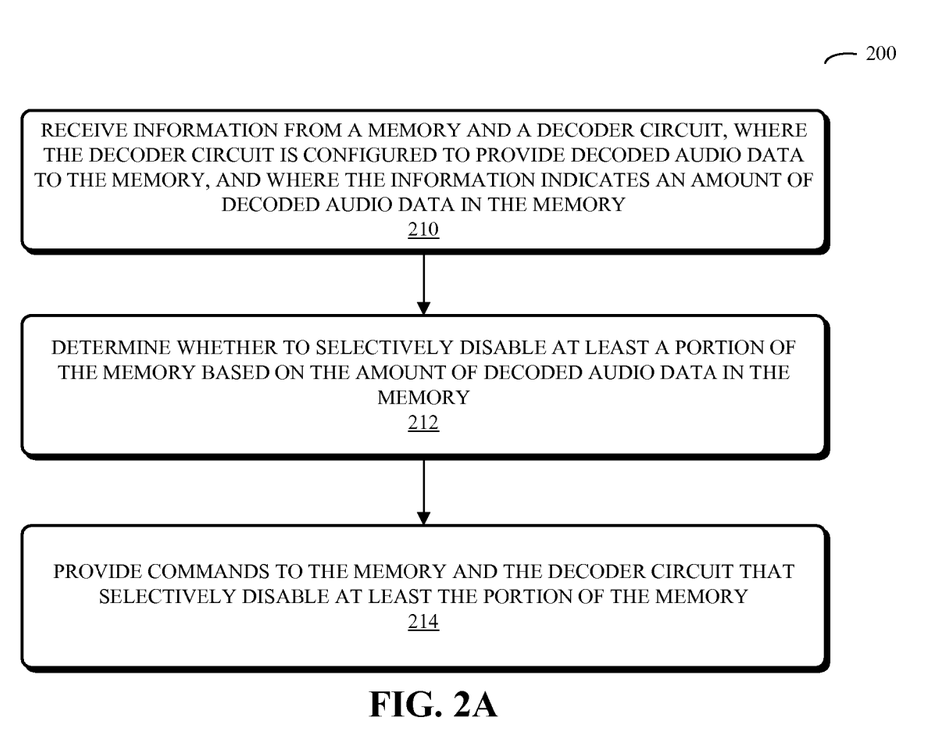
FIG. 2A is a flowchart illustrating a process for conserving power in accordance with an embodiment of the present invention.

Processes for conserving power, which may be performed by a device and/or a system, in accordance with embodiments of the invention are now described. FIG. 2A presents a flowchart illustrating an embodiment of a process 200 for conserving power, which may be implemented by the device and/or the system. During operation, the system receives information from a memory and a decoder circuit (210), where the decoder circuit is configured to provide decoded audio data to the memory, and where the information indicates the amount of decoded audio data in the memory. Next, the system determines whether to selectively disable at least the portion of the memory based on the amount of decoded audio data in the memory (212), and provides commands to the memory and the decoder circuit that selectively disable at least the portion of the memory (214).

Figure 2B:
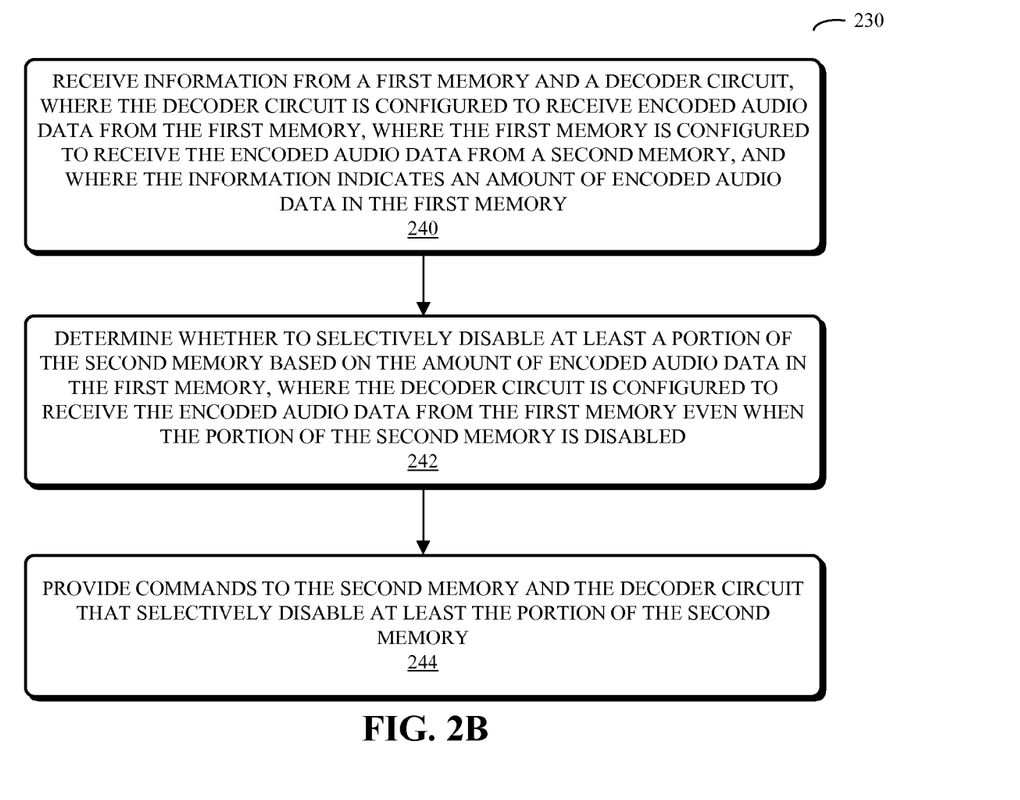
FIG. 2B is a flowchart illustrating a process for conserving power in accordance with an embodiment of the present invention.

FIG. 2B presents a flowchart illustrating an embodiment of a process 230 for conserving power, which may be implemented by the device and/or the system. During operation, the system receives information from a first memory and the decoder circuit (240), where the decoder circuit is configured to receive encoded audio data from the first memory and the first memory is configured to receive the encoded audio data from a second memory. Note that the information indicates an amount of encoded audio data in the first memory.

Next, the system determines whether to selectively disable at least a portion of the second memory based on the amount of encoded audio data in the first memory (242). Note that the decoder circuit is configured to receive the encoded audio data from the first memory even when the portion of the second memory is disabled. Then, the system provides the commands to the second memory and the decoder circuit that selectively disable at least the portion of the second memory (244).

Figure 3:
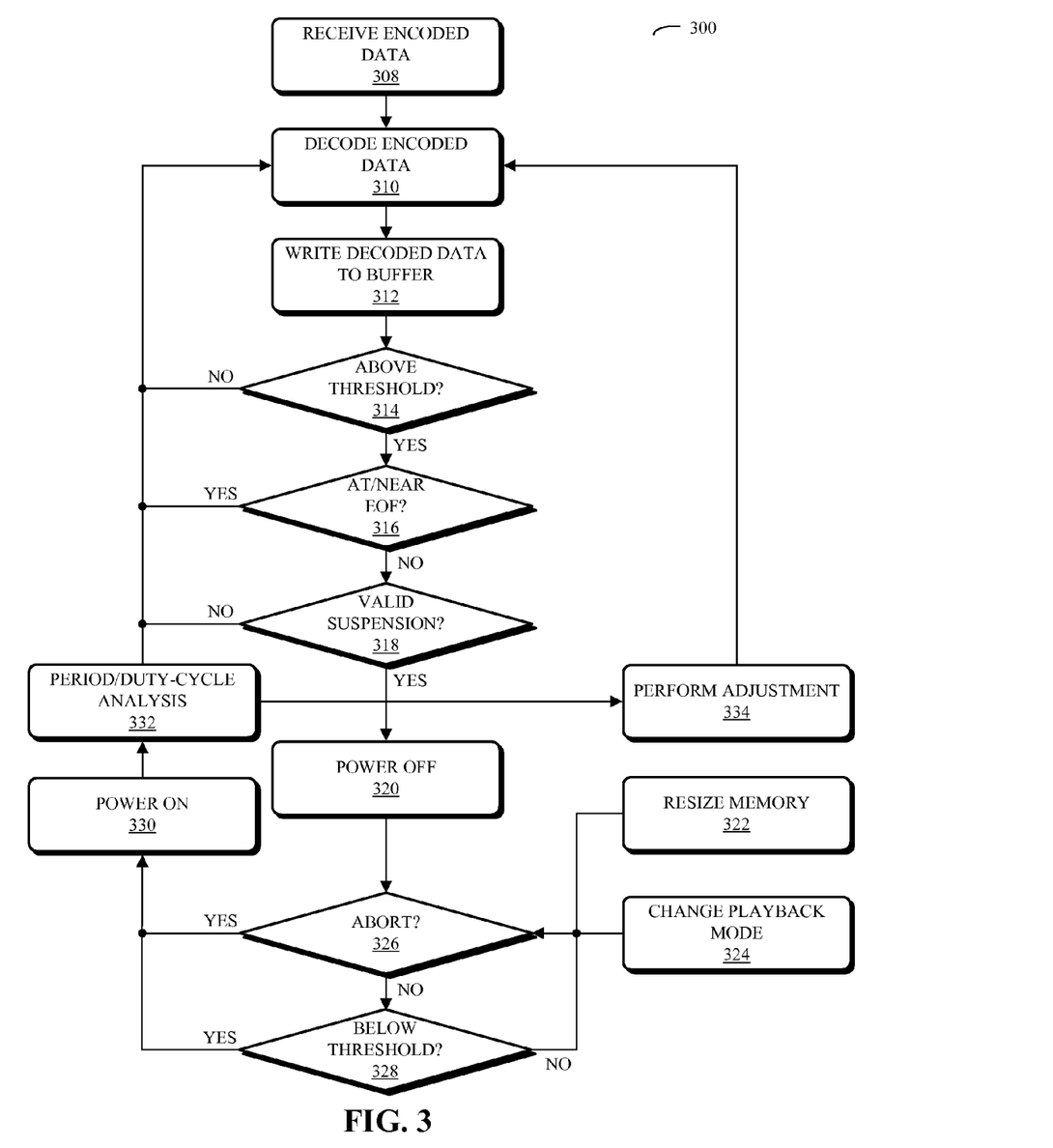
FIG. 3 is a flowchart illustrating a process for conserving power in accordance with an embodiment of the present invention.

FIG. 3 presents a flowchart illustrating an embodiment of a process 300 for conserving power, which may be implemented by the device and/or the system. During operation, the system receives encoded data (308) and decodes the encoded data (310). Next, the system writes the decoded data to a buffer 312.

If the amount of decoded data is less than a threshold (314), operations 310 and 312 continue (as long as there is encoded data to decode). However, if the amount of decoded data is greater than the threshold (314), the system determines if an end of file (EOF) associated with the encoded data is near or has been reached (316). If yes, the process 300 returns to operation 310, and if no, the process 300 continues. Note that this operation allows the process 300 to support continuous playback from file to file by not selectively disabling components in the circuit 100 (FIG. 1) when proximate to an EOF.

Next, the system determines if the suspension (i.e., the selective disabling) is valid (318). This operation is based on a current state of the decoder 114 (FIG. 1). For example, is the decoder 114 (FIG. 1) in a known state with all buffers flushed and/or how well is the decoder currently performing (as indicated by decoding statistics)? As noted previously, this operation allows the decoder 114 (FIG. 1) to gate or veto a potential transition to sleep mode. If the suspension is not valid (318), the process 300 returns to operation 310. However, if the suspension is valid (318), the system powers off (320) one or more components in the circuit 100 (FIG. 1).

Next, the system determines if an abort (326) condition, such as resizing (322) allocated memory (such as a portion of the memory 116 in FIG. 1) and/or changing the playback mode (324), has occurred. For example, the allocated memory 116 (FIG. 1) may be changed to an appropriate size or based on a sample rate, and/or the user may seek to a different location in a file. If the abort condition is not detected, the system determines if the amount of decoded data is lower than the other threshold (328). If not, operations 326 and 328 repeat.

However, if an abort condition is detected (326) or if the amount of decoded data is lower than the other threshold (328), the system powers on (330) the one or more components. Then, the system analyzes a period/duty cycle (332) for the active and sleep modes, performs any necessary adjustments (334) to a clock speed based on desired power management and/or decoding performance, and returns to operation 310 in the process 300. Note that the adjustment (334) may be performed on a file basis. In general, such optimization may be performed: once, periodically, after a time interval since a previous adjustment, and/or as needed.

Note that in some embodiments of the process 200 (FIG. 2A), 230 (FIG. 2B), and/or 300 there may be additional or fewer operations, the order of the operations may be changed, and two or more operations may be combined into a single operation.

Figure 4A:
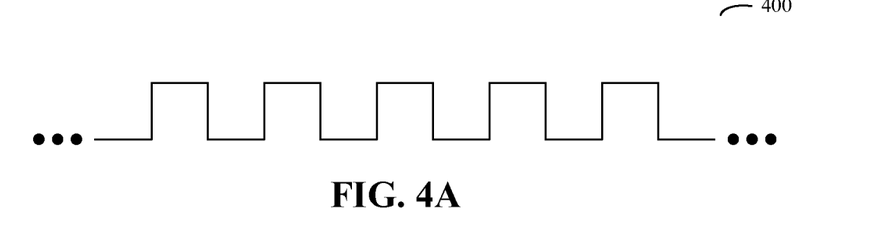
FIG. 4A is a graph illustrating commands as a function of time in accordance with an embodiment of the present invention.

Duty cycles and periods for the active and sleep modes of operation in accordance with embodiments of the invention are now described. FIG. 4A presents a graph illustrating an embodiment of commands 400 as a function of time. In this embodiment, the control logic 126 (FIG. 1) regularly transitions one or more components in the circuit 100 (FIG. 1) to and from the sleep mode of operation. This duty cycle and period may reflect a trade-off between start-up and shut-down energy costs.

Figure 4B:
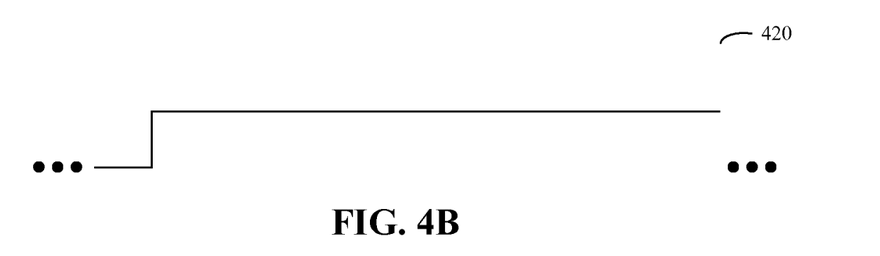
FIG. 4B is a graph illustrating commands as a function of time in accordance with an embodiment of the present invention.

FIG. 4B presents a graph illustrating an embodiment of commands 420 as a function of time. In this embodiment, the control logic 126 (FIG. 1) may keep the circuit 100 (FIG.

1) on almost all the time, thereby accepting additional power consumption associated with such a fixed power overhead in exchange for continuous decoding of encoded data. This may be useful when the hardware consumer 120 (FIG. 1) consumes decoded data at a high rate.

Figure 4C:
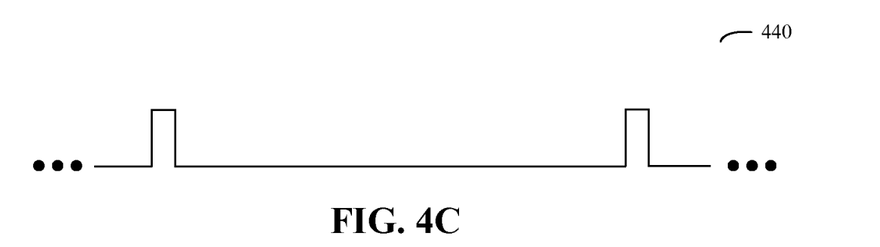
FIG. 4C is a graph illustrating commands as a function of time in accordance with an embodiment of the present invention.

However, if the rate of consumption is low, the control logic 126 (FIG. 1) may selectively transition one or more components in the circuit 100 (FIG. 1) to the sleep mode for most of the time (i.e., a low active-mode duty cycle). This is shown in FIG. 4C, which presents a graph illustrating an embodiment of commands 440 as a function of time.

Figure 5:
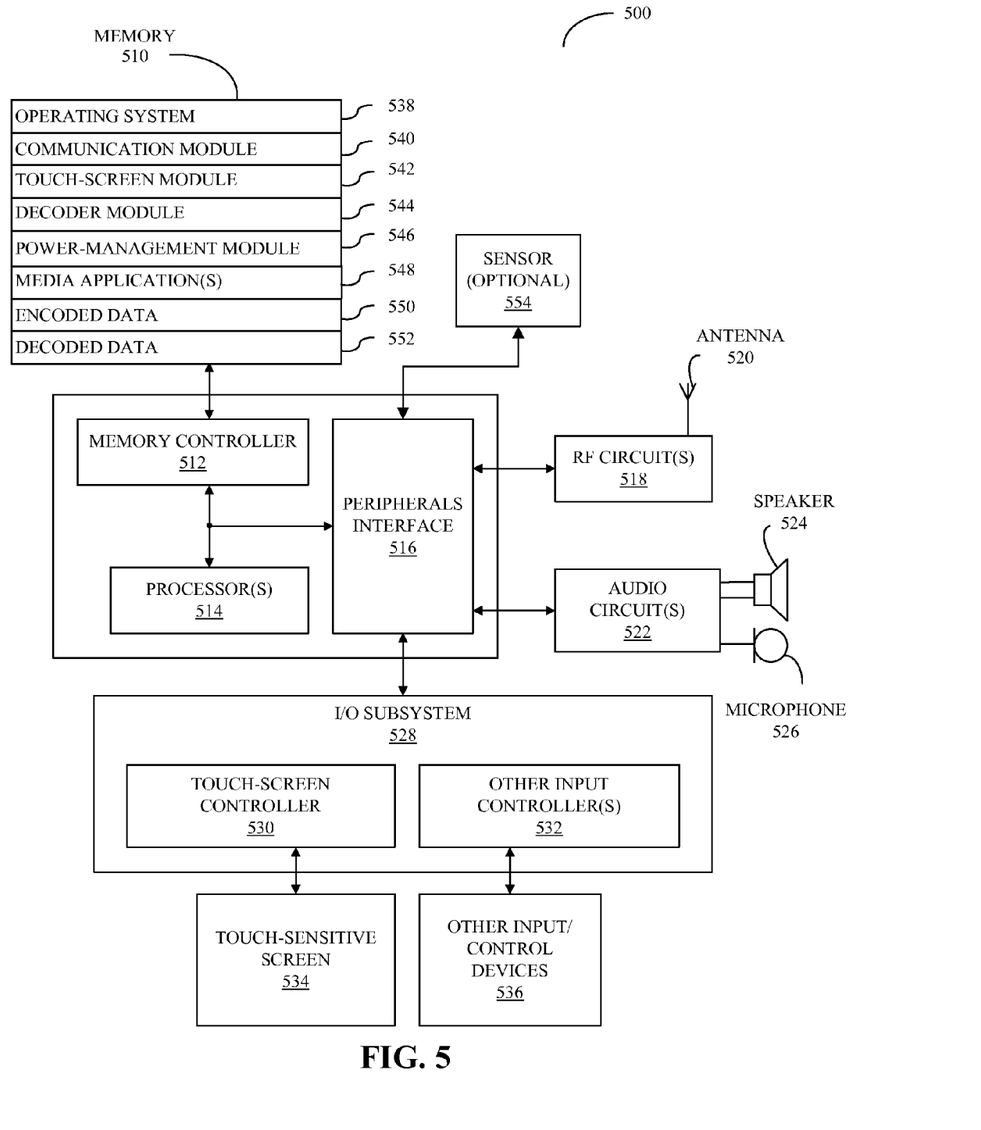
FIG. 5 is a block diagram illustrating a portable device in accordance with an embodiment of the present invention.

Devices and computer systems for implementing these power-management techniques in accordance with embodiments of the invention are now described. FIG. 5 presents a block diagram illustrating an embodiment of a portable device 500, which may include a touch-sensitive screen 534. This device may include a memory controller 512, one or more data processors, image processors and/or central processing units 514, and a peripherals interface 516. Moreover, the memory controller 512, the one or more processors 514, and/or the peripherals interface 516 may be separate components or may be integrated, such as on one or more integrated circuits. Note that the various components in the portable device 500 may be electrically coupled by one or more signal lines and/or communication buses.

Peripherals interface 516 may be electrically coupled to: an optional sensor 554 (such as CMOS or CCD image sensor), one or more RF circuits 518, one or more audio circuits 522, and/or an input/output (I/O) subsystem 528. These audio circuits 522 may be electrically coupled to a speaker 524 and a microphone 526. Note that the portable device 500 may support voice recognition and/or voice replication.

Moreover, the RF circuits 518 may be electrically coupled to one or more antennas 520 and may allow communication with one or more additional devices, computers and/or servers using a wireless network. Consequently, in some embodiments portable device 500 supports one or more communication protocols, including: code division multiple access (CDMA), global system for mobile communications (GSM), Enhanced Data GSM Environment (EDGE), Wi-Fi (such as IEEE 802.11a, IEEE 802.11b, IEEE 802.11g, and/or IEEE 802.11n), Bluetooth, Wi-MAX, a protocol for email, instant messaging, a simple message system (SMS), and/or any other suitable communication protocol (including communication protocols not yet developed as of the filing date of this document). In an exemplary embodiment, the portable device 500 is, at least in part, a cellular telephone.

In some embodiments, I/O subsystem 528 includes a touch-screen controller 530 and/or other input controller(s) 532. This touch-screen controller may be electrically coupled to a touch-sensitive screen 534. Moreover, the touch-sensitive screen 534 and the touch-screen controller 530 may detect contact and any movement or break thereof using any of a plurality of touch-sensitivity technologies, including but not limited to: capacitive, resistive, infrared, and/or surface acoustic wave technologies, as well as other proximity sensor arrays or other elements for determining one or more points of contact with the touch-sensitive screen 534. In an exemplary embodiment, the touch-sensitive screen 534 has a resolution in excess of 100 dpi, such as approximately 168 dpi.

Note that the other input controller(s) 532 may be electrically coupled to other input/control devices 536, such as: one or more physical buttons, a keyboard, an infrared port, a USB port, and/or a pointer device (such as a mouse).

Moreover, the one or more physical buttons may include an up/down button for volume control of the speaker 524 and/or the microphone 526.

In some embodiments, the one or more physical buttons include a push button. By quickly pressing the push button, a user of the portable device 500 may disengage locking of the touch-sensitive screen 534. Alternatively, by pressing the push button for a longer time interval, the user may turn power to the portable device 500 on or off. Moreover, the touch-sensitive screen 534 may be used to implement virtual or soft buttons and/or a keyboard. Note that the user may be able to customize a functionality of one or more of the virtual and/or physical buttons.

In some embodiments, the portable device 500 includes circuits for supporting a location determining capability, such as that provided by the global positioning system (GPS). Moreover, the portable device 500 may be used to play back recorded music, such as one or more files, including MP3 files or AAC files. Consequently, in some embodiments the portable device 500 includes the functionality of an MP3 player, such as an iPod (trademark of Apple, Inc.). Therefore, the portable device 500 may include a connector that is compatible with the iPod™.

Memory controller 512 may be electrically coupled to memory 510. Memory 510 may include high-speed random access memory and/or non-volatile memory, such as: one or more magnetic disk storage devices, one or more optical storage devices, and/or FLASH memory. Memory 510 may store an operating system 538, such as: Darwin, RTXC, LINUX, UNIX, OS X, Windows, and/or an embedded operating system such as VxWorks. This operating system may include procedures (or sets of instructions) for handling basic system services and for performing hardware-dependent tasks. Moreover, memory 510 may also store communication procedures (or sets of instructions) in a communication module 540. These communication procedures may be used for communicating with one or more additional devices, one or more computers and/or one or more servers.

Memory 510 may include a touch-screen module 542 (or a set of instructions), a decoder module 544 (or a set of instructions), and/or a power-management module 546 (or a set of instructions). Touch-screen module 542 may provide graphics associated with the virtual buttons and/or keyboard. Moreover, the decoder module 544 may receive encoded data 550 to produce decoded data 552, which is consumed by one or more media applications 548. In some embodiments, the power-management module 546 (and/or one or more circuits that implement the functionality of the power-management module 546) may selectively transition one or more components associated with the decoder module 544 to and/or from a sleep mode of operation.

Note that each of the above-identified modules and applications corresponds to a set of instructions for performing one or more functions described above. These modules (e.g., sets of instructions) need not be implemented as separate software programs, procedures or modules. Consequently, the various modules and sub-modules may be rearranged and/or combined. Moreover, memory 510 may include additional modules and/or sub-modules, or fewer modules and/or sub-modules. Therefore, memory 510 may include a subset or a superset of the above-identified modules and/or sub-modules.

Moreover, instructions in the various modules in the memory 510 may be implemented in a high-level procedural language, an object-oriented programming language, and/or in an assembly or machine language. The programming language may be compiled or interpreted, e.g., configurable or configured to be executed by the one or more processing units 514. Consequently, the instructions may include high-level code in a program module and/or low-level code, which is executed by the processor(s) 514 in the portable device 500. Note that various functions of the device 500 may be implemented in hardware and/or in software, including in one or more signal processing and/or application-specific integrated circuits.

Figure 6:
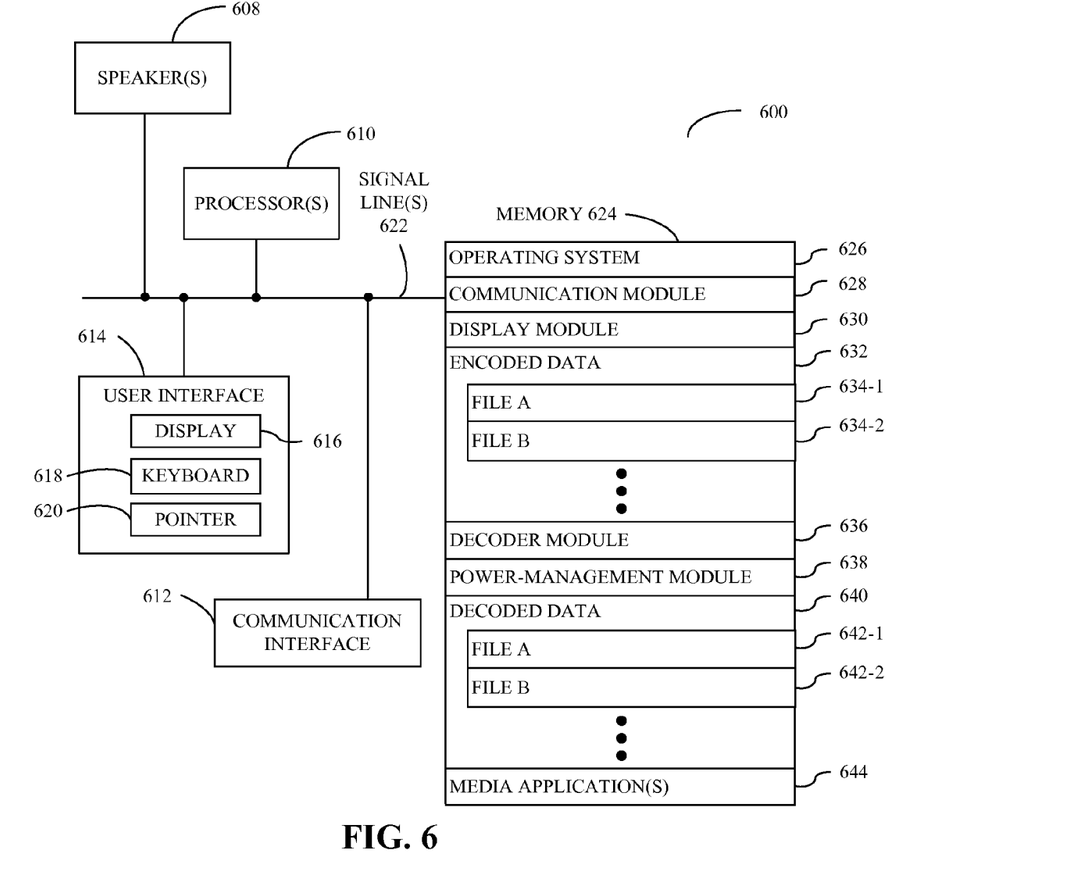
FIG. 6 is a block diagram illustrating a computer system in accordance with an embodiment of the present invention.

FIG. 6 presents a block diagram illustrating an embodiment of a computer system 600. Computer system 600 can include: one or more processors 610, a communication interface 612, a user interface 614, speakers 608, and/or one or more signal lines 622 electrically coupling these components together. Note that the one or more processing units 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in the computer system 600 may include volatile memory and/or non-volatile memory. More specifically, memory 624 may include: ROM, RAM, EPROM, EEPROM, FLASH, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store communication procedures (or a set of instructions) in a communication module 628. These communication procedures may be used for communicating with one or more computers and/or servers, including computers and/or servers that are remotely located with respect to the computer system 600.

Memory 624 may include multiple program modules (or a set of instructions), including: display module 630 (or a set of instructions), decoder module 636 (or a set of instructions), and/or power-management module 638 (or a set of instructions). Display module 630 may provide graphics for display on display 616. Moreover, the decoder module 636 may receive encoded data 632 (such as file A 634-1 and/or file B 634-2) and may produce decoded data 640 (such as file A 642-1 and/or file B 642-2), which is consumed by one or more media applications 644. In some embodiments, the power-management module 638 (and/or one or more circuits that implement the functionality of the power-management module 638) may selectively transition one or more components associated with the decoder module 636 to and/or from a sleep mode of operation.

Instructions in the various modules in the memory 624 may be implemented in a high-level procedural language, an object-oriented programming language, and/or in an assembly or machine language. The programming language may be compiled or interpreted, e.g., configurable or configured to be executed by the one or more processing units 610. Consequently, the instructions may include high-level code in a program module and/or low-level code, which is executed by the processor 610 in the computer system 600.

Although the computer system 600 is illustrated as having a number of discrete components, FIG. 6 is intended to provide a functional description of the various features that may be present in the computer system 600 rather than a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more application-specific integrated circuits (ASICs) and/or one or more digital signal processors (DSPs).

Computer system 600 may include fewer components or additional components. Moreover, two or more components can be combined into a single component and/or a position of one or more components can be changed. In some embodiments the functionality of the computer system 600 may be implemented more in hardware and less in software, or less in hardware and more in software, as is known in the art.

Figure 7:
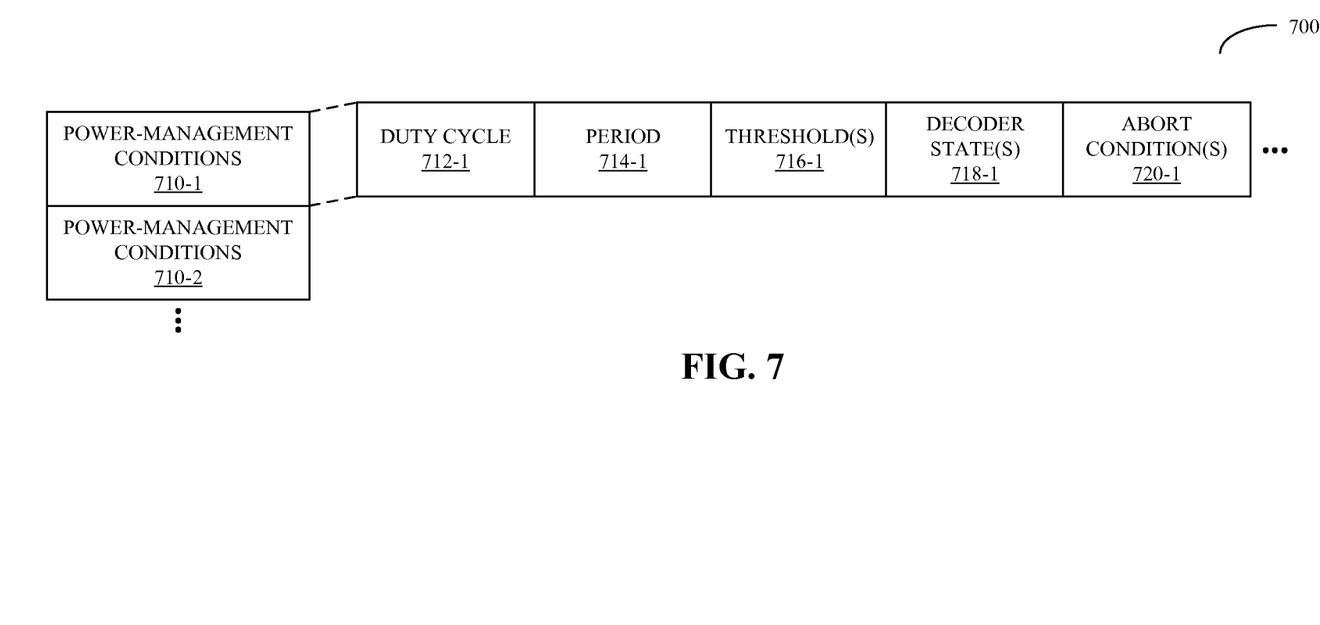
FIG. 7 is a block diagram illustrating a data structure in accordance with an embodiment of the present invention.

Data structures that may be used in the portable device 500 (FIG. 5) and/or the computer system 600 in accordance with embodiments of the invention are now described. FIG. 7 presents a block diagram illustrating an embodiment of a data structure 700. This data structure may include one or more instances of power-management conditions 710, which may be used to determine when to selectively transition to and/or from the sleep mode of operation. A given instance of the power-management conditions, such as power-management conditions 710-1, may include: a targeted duty cycle 712-1, a targeted period 714-1, one or more thresholds 716-1, acceptable decoder states 718-1, and/or one or more abort conditions 720-1.

Note that in some embodiments of the data structure 700 there may be fewer or additional components. Moreover, two or more components can be combined into a single component and/or a position of one or more components can be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system, comprising:
a first memory configured to store encoded audio data;
a second memory configured to store decoded audio data;
a decoder circuit configured to receive encoded audio data from the first memory and to output decoded audio data to the second memory; and
control logic electrically coupled to the first memory, the second memory, and the decoder circuit, the control logic configured to receive information of an amount of encoded audio data in the first memory and an amount of decoded audio data in the second memory and to—
selectively disable and enable at least a portion of the first memory by decoupling and coupling a power signal to the at least a portion of the first memory based at least in part on the amount of encoded audio data in the first memory,
selectively disable and enable at least a portion of the second memory by decoupling and coupling a power signal to the at least a portion of the second memory based at least in part on the amount of decoded audio data in the second memory, and
selectively disable and enable the decoder circuit based at least in part on the amount of encoded audio data in the first memory and the amount of decoded audio data in the second memory.

2. The system of claim 1, wherein the control logic is configured to select a duty cycle or a period for the selective disabling.

3. The system of claim 1, wherein the control logic is further configured to selectively decouple and couple a clock signal used by the at least a portion of the first memory or the at least a portion of the second memory.

4. The system of claim 1, wherein the selective disabling is based on transient power consumption associated with disabling the at least a portion of the first memory or the at least a portion of the second memory.

5. The system of claim 1, wherein the control logic is further configured to selectively disable at least one of the at least a portion of the first memory, the at least a portion of the second memory, and the decoder circuit when the amount of decoded audio data in the second memory exceeds a first pre-determined value.

6. The system of claim 1, wherein the control logic is further configured to:
selectively disable at least one of the at least a portion of the first memory, the at least a portion of the second memory, and the decoder circuit when the amount of decoded audio data in the second memory exceeds a first pre-determined value, and
selectively enable at least one of the at least a portion of the first memory, the at least a portion of the second memory, and the decoder circuit when the amount of decoded audio data in the second memory is less than a second pre-determined value.

7. The system of claim 6, wherein the first pre-determined value is different from the second pre-determined value.

8. The system of claim 1, wherein the selective disabling of the at least a portion of the second memory is based on an amount of audio data remaining to be decoded or a rate of decoding of the audio data.

9. The system of claim 1, wherein the selective disabling of the at least a portion of the second memory is based on an amount of memory allocated for the decoded audio data.

10. The system of claim 1, wherein the control logic is further configured to abort the selective disabling of the at least a portion of the second memory when a mode of playing the decoded audio data is changed or when a new mode of playing increases consumption of the decoded audio data in the second memory.

11. The system of claim 1, wherein the control logic is further configured to abort the selective disabling of the at least a portion of the second memory when an amount of memory allocated for the decoded audio data is changed.

12. The system of claim 1, wherein the control logic is further configured to abort the selective disabling of the at least a portion of the second memory when an end of a file associated with the decoded audio data is detected.

13. The system of claim 1, wherein the control logic is further configured to abort the selective disabling of the at least a portion of the second memory based on a state of the decoder circuit.

14. A method for conserving power in an electronic device, comprising the use of:
a first memory;
a second memory;
a decoder circuit, wherein the decoder circuit is configured to receive encoded audio data from the first memory and provide decoded audio data to the second memory; and control logic, wherein the control logic is electrically coupled to the first memory, the second memory, and the decoder circuit and wherein the control logic is configured to receive information of the amount of encoded audio data in the first memory and the amount of decoded audio data in the second memory and to—
selectively disable and enable at least a portion of the first memory by decoupling and coupling a power signal to the at least a portion of the first memory based at least in part on the amount of encoded audio data in the first memory,
selectively disable and enable at least a portion of the second memory by decoupling and coupling a power signal to the at least a portion of the second memory based at least in part on the amount of decoded audio data in the second memory, and
selectively disable and enable the decoder circuit based at least in part on the amount of encoded audio data in the first memory and the amount of decoded audio data in the second memory.

15. A system configured to execute instructions to conserve power, comprising:
a processor;
a memory;
an instruction fetch unit within the processor configured to fetch:
instructions for receiving information from a first memory and a decoder circuit, the decoder circuit being configured to receive encoded audio data from the first memory, and the information indicating an amount of encoded audio data in the first memory;
instructions for receiving information from a second memory and the decoder circuit, the decoder circuit further configured to provide decoded audio data to the second memory, and the information further indicating an amount of decoded audio data in the second memory;
instructions for determining whether to selectively disable or enable at least a portion of the first memory by decoupling and coupling a power signal to the at least a portion of the first memory based at least in part on the amount of encoded coded audio data in the first memory;
instructions for determining whether to selectively disable or enable at least a portion of the second memory by decoupling and coupling a power signal to the at least a portion of the first memory based at least in part on the amount of decoded audio data in the second memory;
instructions for determining whether to selectively disable or enable the decoder circuit based at least in part on the amount of encoded audio data in the first memory and the decoded audio data in the second memory; and
instructions for providing commands to the first memory, the second memory and the decoder circuit that selectively disables and enables the at least a portion of the first memory, the at least a portion of the second memory, and the decoder circuit; and
an execution unit within the processor configured to execute the instructions for receiving, the instructions for determining, and the instructions for providing the commands.

* * * * *